(12) United States Patent
Yuan et al.

(10) Patent No.: US 7,565,262 B2
(45) Date of Patent: Jul. 21, 2009

(54) BAYESIAN SENSOR ESTIMATION FOR MACHINE CONDITION MONITORING

(75) Inventors: Chao Yuan, Secaucus, NJ (US); Claus Neubauer, Monmouth Junction, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 35 days.

(21) Appl. No.: 11/866,535

(22) Filed: Oct. 3, 2007

(65) Prior Publication Data
US 2008/0086283 A1    Apr. 10, 2008

Related U.S. Application Data

(60) Provisional application No. 60/849,700, filed on Oct. 5, 2006.

(51) Int. Cl.
*G06F 17/18* (2006.01)
(52) U.S. Cl. .................. 702/180; 702/181; 702/185
(58) Field of Classification Search ......... 702/180–183, 702/185; 340/506; 706/52
See application file for complete search history.

(56) References Cited

U.S. PATENT DOCUMENTS

| 6,415,276 | B1 * | 7/2002 | Heger et al. ............... 706/52 |
| 6,594,620 | B1 * | 7/2003 | Qin et al. ................. 702/185 |
| 7,096,159 | B2 * | 8/2006 | Cataltepe et al. .......... 702/185 |
| 7,158,917 | B1 * | 1/2007 | Bickford ................. 702/181 |
| 7,183,905 | B2 * | 2/2007 | Neubauer et al. ......... 340/506 |
| 7,216,061 | B2 * | 5/2007 | Yuan et al. .............. 702/185 |

* cited by examiner

*Primary Examiner*—John H Le

(57) ABSTRACT

A method for monitoring a system includes receiving a set of training data. A Gaussian mixture model is defined to model a probability distribution for a particular sensor of the system from among a plurality of sensors of the system based on the received training data. The Gaussian mixture model includes a sum of k mixture components, where k is a positive integer. Sensor data is received from the plurality of sensors of the system. An expectation-maximization technique is performed to estimate an expected value for the particular sensor based on the defined Gaussian mixture model and the received sensor data from the plurality of sensors.

19 Claims, 5 Drawing Sheets

BAYESIAN SENSOR ESTIMATION FOR MACHINE CONDITION MONITORING

CROSS-REFERENCE TO RELATED APPLICATION

The present application is based on provisional application Ser. No. 60/849,700, filed Oct. 5, 2006, the entire contents of which are herein incorporated by reference.

BACKGROUND OF THE INVENTION

1. Technical Field

The present disclosure relates to machine condition monitoring and, more specifically, to Bayesian sensor estimation for machine condition monitoring.

2. Discussion of the Related Art

Condition monitoring relates to the observation and analysis of one or more sensors that sense key parameters of machinery. By closely observing the sensor data, a potential failure or inefficiency may be detected and remedial action may be taken, often before a major system failure occurs.

Effective condition monitoring may allow for increased uptime, reduced costs associated with failures, and a decreased need for prophylactic replacement of machine components.

Condition monitoring may be applied to a wide variety of industrial machinery such as capitol equipment, factories and power plants; however, condition monitoring may also be applied to other mechanical equipment such as automobiles and non-mechanical equipment such as computers. In fact, principals of condition monitoring may be applied more generally to any system or organization. For example, principals of condition monitoring may be used to monitor the vital signs of a patient to detect potential health problems. For example, principals of condition monitoring may be applied to monitor performance and/or economic indicators to detect potential problems with a corporation or an economy.

In condition monitoring, one or more sensors may be used. Examples of commonly used sensors include vibration sensors for analyzing a level of vibration and/or the frequency spectrum of vibration. Other examples of sensors include temperature sensors, pressure sensors, spectrographic oil analysis, ultrasound, and image recognition devices.

A sensor may be a physical sensory device that may be mounted on or near a monitored machine component or a sensor may more generally refer to a source of data.

Conventional techniques for condition monitoring acquire data from the one or more sensors and analyze the collected data to detect when the data is indicative of a potential fault. Inferential sensing is an example of an approach that may be used to determine when sensor data is indicative of a potential fault.

In inferential sensing, an expected value for a particular sensor $\hat{x}$ is estimated, for example, through the use of other observed sensors y. The actual sensor value y may then be compared to the expected sensor value $\hat{x}$, and the larger the difference between the two values, the greater the likelihood of a potential fault.

Accordingly, fault diagnosis is typically performed in two steps. In the first step, based on observed sensor values y, the expected particular sensor value $\hat{x}$ is calculated. This step is known as "sensor estimation." The "residue" is defined as the difference between the estimated value $\hat{x}$ and the observed value y. Then, in a "rule-based decision step," the values of y, $\hat{x}$ and the residue are analyzed with respect to a set of rules to properly identify the presence of and type of a potential fault.

The set of rules are generally defined by experts familiar with the correct operations of the system being monitored.

In the sensor estimation step, a variety of techniques may be used to provide the estimated value $\hat{x}$ based on the set of observed sensor values y. Such approach may involve the use of multivariate state estimation techniques (MSET) or auto-associate neural networks (AANN). Details concerning these approaches may be found, for example, in J. W. Hines, A. Gribok and B. Rasmussen (2001), "On-Line Sensor Calibration Verification: A survey," International Congress and Exhibition on Condition Monitoring and Diagnostic Engineering Management, incorporated herein by reference.

In each of these methods, involve the building of multiple-input-multiple-output networks to calculate $\hat{x}$ based on the set of observed sensor values y. The networks themselves may be established base on a set of training data that includes the sensor values X and Y observed during fault-free operation of the system being monitored. Later, when the system being monitored is brought on-line, observed faults may be difficult to detect because the characteristics of the observed faults would not have been observed during the period of collection of the training data.

Accordingly, artificial faults may be added to the training data as is done in D. Wrest, J. W. Hines, and R. E. Uhrig (1996), "Instrument Surveillance and Calibration Verification Through Plant Wide Monitoring Using Autoassociative Neural Networks," The American Nuclear Society International Topical Meeting on Nuclear Plant Instrumentation, Control and Human Machine Interface Technologies, May 6-9, 1996, incorporated herein by reference. However, it may be difficult or impossible to obtain artificial fault data for every conceivable fault, given the number of possible deviations and the high dimensionality of the sensor vector.

Another approach to providing the estimated value $\hat{x}$ based on the set of observed sensor values y involves support vector regression (SVR). Examples of such approaches may be found in A. V. Gribok, J. W. Hines and R. E. Uhrig (2000), "Use of Kernel Based Techniques for Sensor Validation in Nuclear Power Plants," International Topical Meeting on Nuclear Plant Instrumentation, Controls and Human-Machine Interface Technologies, incorporated herein by reference.

In SVR, an estimate for a particulate sensor $X_i$ ($\hat{x}_i$) is determined from the observed values of other sensors $y_{j \neq i}$. SVR makes the basic assumption that $X_i$ is predictable from $y_{j \neq i}$, however, this assumption often does not hold true. For example, in a power plant, a process driver inlet temperature is not accurately predictable based on any other sensor values. Additionally, a fault within the sensors $y_{j \neq i}$ may result in an inaccurate estimation for $X_i$, even if the i-th sensor is normal.

SUMMARY

A method for monitoring a system includes receiving a set of training data. A Gaussian mixture model is defined to model a probability distribution for a particular sensor of the system from among a plurality of sensors of the system based on the received training data. The Gaussian mixture model includes a sum of k mixture components, where k is a positive integer. Sensor data is received from the plurality of sensors of the system. An expectation-maximization technique is performed to estimate an expected value for the particular sensor based on the defined Gaussian mixture model and the received sensor data from the plurality of sensors.

An actual sensor value may be received from the particular sensor. The received actual sensor value may be compared to the estimated expected sensor value. A potential fault may be detected based on the comparison.

Performing the expectation-maximization technique may include ranking the k mixture components according to a degree of influence on the Gaussian mixture model, selecting a set of mixture components that are most influential, iteratively improving an estimation of the expected value for the particular sensor based on a diagonal covariance matrix that contributes to a relationship between the received sensor data from the plurality of sensors and the expected value for the particular sensor, using the selected set of mixture components, iteratively improving an estimation of the diagonal covariance matrix using the selected set of mixture components, and repeating the steps of iteratively improving the estimation of the expected value for the particular sensor and iteratively improving the estimation of the diagonal covariance matrix until the two estimates achieve convergence.

Convergence may be achieved by repeating the steps of iteratively improving the estimation of the expected value for the particular sensor and iteratively improving the estimation of the diagonal covariance matrix until subsequent improvements are negligible.

Performing the expectation-maximization technique may include estimating the expected value for the particular sensor, and estimating a diagonal covariance matrix that contributes to a relationship between the received sensor data from the plurality of sensors and the expected value for the particular sensor, wherein the two estimations are performed at substantially the same time.

The training data may include sensor data from the plurality of sensors and sensor data from the particular sensor taken during a period of fault-free operation of the system.

Each of the k mixture components may be a Gaussian distribution defined by a mean and a variance that are determined during the performance of the expectation-maximization technique.

A system for monitoring a machine includes a plurality of sensors for monitoring the machine including a particular sensor. A Gaussian mixture model defining unit defines a Gaussian mixture model to for estimating an expected value for the particular sensor. The Gaussian mixture model includes a sum of a plurality of mixture components. An estimation unit estimates the expected value for the particular sensor based on the defined Gaussian mixture model.

Training data may be used by the Gaussian mixture model defining unit in defining the plurality of mixture components.

The training data may include sensor data from the plurality of sensors and sensor data from the particular sensor taken during a period of fault-free operation of the machine.

An expectation-maximization technique may be used to estimate an expected value for the particular sensor based on the defined Gaussian mixture model and the received sensor data from the plurality of sensors.

Performing the expectation-maximization technique may include ranking the plurality of mixture components according to a degree of influence on the Gaussian mixture model, selecting a set of mixture components that are most influential, iteratively improving an estimation of the diagonal covariance matrix using the selected set of mixture components, and repeating the steps of iteratively improving the estimation of the expected value for the particular sensor and iteratively improving the estimation of the diagonal covariance matrix until the two estimates achieve convergence.

Convergence may be achieved by repeating the steps of iteratively improving the estimation of the expected value for the particular sensor and iteratively improving the estimation of the diagonal covariance matrix results in a negligible improvement.

Performing the expectation-maximization technique may include estimating the expected value for the particular sensor, and estimating a diagonal covariance matrix that contributes to a relationship between the received sensor data from the plurality of sensors and the expected value for the particular sensor. The two estimations may be performed at substantially the same time.

A computer system includes a processor and a program storage device readable by the computer system, embodying a program of instructions executable by the processor to perform method steps for monitoring a system. The method includes receiving a set of training data. A Gaussian mixture model is defined to model a probability distribution for a particular sensor of the system from among a plurality of sensors of the system based on the received training data. The Gaussian mixture model includes a sum of k mixture components, where k is a positive integer. Sensor data is received from the plurality of sensors of the system, and an expectation-maximization technique is performed to estimate an expected value for the particular sensor based on the defined Gaussian mixture model and the received sensor data from the plurality of sensors. Each of the k mixture components is a Gaussian distribution defined by a mean and a variance that are determined during the performance of the expectation-maximization technique.

An actual sensor value may be received from the particular sensor. The received actual sensor value may be compared to the estimated expected sensor value. A potential fault may be detected based on the comparison.

Performing the expectation-maximization technique may include ranking the k mixture components according to a degree of influence on the Gaussian mixture model. A set of mixture components that are most influential may be selected. An estimation of the expected value for the particular sensor may be iteratively improved based on a diagonal covariance matrix that contributes to a relationship between the received sensor data from the plurality of sensors and the expected value for the particular sensor, using the selected set of mixture components. An estimation of the diagonal covariance matrix may be iteratively improved using the selected set of mixture components. The steps of iteratively improving the estimation of the expected value for the particular sensor and iteratively improving the estimation of the diagonal covariance matrix may be repeated until the two estimates achieve convergence.

Convergence may be achieved when repeating the steps of iteratively improving the estimation of the expected value for the particular sensor and iteratively improving the estimation of the diagonal covariance matrix results in a negligible improvement.

Performing the expectation-maximization technique may include estimating the expected value for the particular sensor, and estimating a diagonal covariance matrix that contributes to a relationship between the received sensor data from the plurality of sensors and the expected value for the particular sensor. The two estimations may be performed at substantially the same time.

The training data may include sensor data from the plurality of sensors and sensor data from the particular sensor taken during a period of fault-free operation of the system.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF THE DRAWINGS

Figure 1:
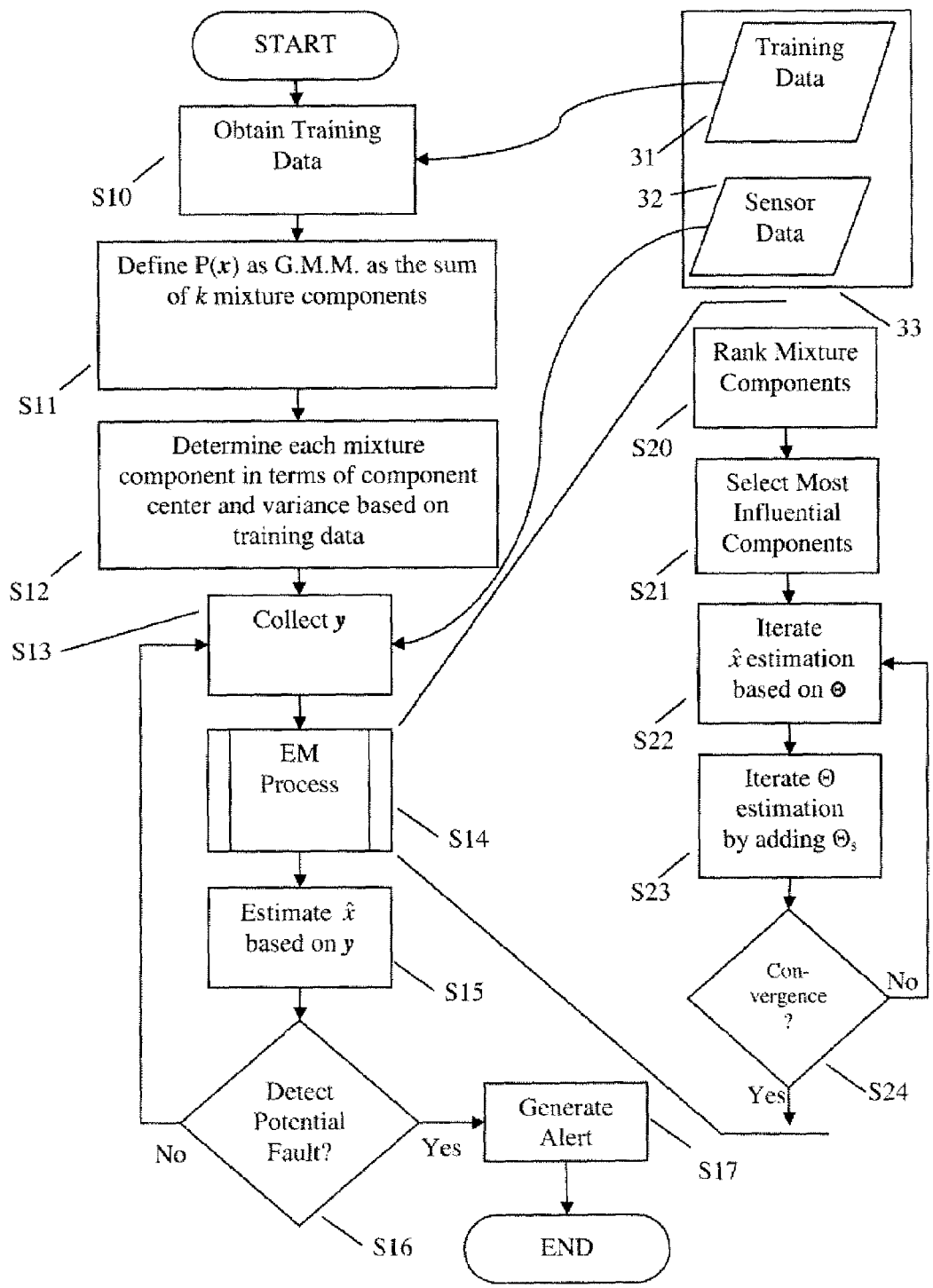
FIG. 1 is a flow chart illustrating an approach to system condition monitoring according to an exemplary embodiment of the present invention.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention utilize a Bayesian framework to determine a general-case probability distribution for determining an expected value for X from detected sensor data Y. A Gaussian mixture model (GMM) may be used to model the probability distribution of the potential values for X. A GMM is an approach to characterizing a distribution, here the potential values of X, as a combination of other constituent distributions, each of which may be a Gaussian distribution.

These constituent distributions may be considered mixture components, and each mixture component may be a Gaussian distribution. The complete probability distribution for x may be a combination of k such mixture components, where k is a positive integer.

Here, a random Gaussian vector $\epsilon$ is introduced to represent the possible relationship between Y and X. Thus, $\epsilon$ incorporates a covariance matrix that can transform Y into an expected value for X. The covariance matrix of $\epsilon$ is assumed to be an unknown parameter and may be estimated adaptively for each input Y.

In using a Gaussian mixture model (GMM) to characterize the probability distribution of x, the following expression may be used:

$$P(x) = \sum_{s=1}^{k} P(x|s)P(s) \quad (1)$$

wherein P(x) represents the probability distribution of X and P(x) is defined as a sum of k mixture components from s=1 to s=k. Thus s is the label for the s-th mixture component, P(s) is the probability distribution based on the s-th mixture component, and P(x|s) is the probability distribution of X given the s-th mixture component. The probability distribution for each P(x|s) may have a Gaussian distribution and may be expressed $P(x|s) \sim N(m_{x|s}, c_{x|s})$, where $m_{x|s}$ is the mean and $c_{x|s}$ is the covariance of the Gaussian distribution for the s-th mixture component.

Accordingly, the relationship between y, x, and $\epsilon$ may be expresses in terms of the deviation vector $\epsilon$ as follows:

$$y = x + \epsilon \quad (2)$$

Initially, $\epsilon$ may be set to have a Gaussian distribution with a mean of zero and an unknown diagonal covariance matrix $\Theta$. Accordingly, $\epsilon \sim N(0, \Theta)$. The dimensionality of x may be expressed as d and thus $\Theta$ has d free parameters.

Of the complete set of i sensors, the diagonal covariance matrix $\Theta$ includes the variance of deviation for each sensor i, with each variance of deviation expressed as $\Theta_i$. When an i-th sensor is normal, the deviation $\Theta_i$ is small indicating that $x_i$ is close to $y_i$. Meanwhile, when the i-th sensor is faulty, $\Theta_i$ is large indicating that $x_i$ is not close to $y_i$. Because the diagonal covariance matrix $\Theta$ comprises a set of variances that each depend on the observed sensor data, $\Theta$ is adaptive rather than fixed.

As described above, the actual sensor value of a particular monitored sensor is x, y is the full set of observed sensor data in the monitored system, and $\hat{x}$ is the expected value for x. Accordingly, the expected value $\hat{x}$ is the conditional expectation of x given y:

$$\hat{x} = E(x|y) \quad (3)$$

Given equation (1), the conditional expectation may be written as a GMM as follows:

$$E(x|y) = \sum_{s=1}^{k} P(s|y)E(x|y, s) \quad (4)$$

However, because $\Theta$ is adaptive and initially unknown, both $\Theta$ and $\hat{x}$ are estimated and thus the GMM is determined with two unknowns. Exemplary embodiments of the present invention estimate both $\Theta$ and $\hat{x}$ substantially simultaneously.

An expectation-maximization (EM) approach may be used to estimate $\hat{x}$ and $\Theta$ at substantially the same time. A more detailed explanation of EM approaches may be found in A. P. Dempster, N. M. Laird and D. B. Rubin (1977), "Maximum-likelihood from Incomplete Data via the EM Algorithm," Journal of the Royal Statistical Society, Series B, 39, pp. 1-38, which is hereby incorporated by reference.

EM approaches allow for maximum likelihood estimation of a parameter when variables are hidden. Here, $\hat{x}$ may be viewed as the hidden variable and $\Theta$ may be the parameter to be estimated. As used herein, the EM approach includes an expectation step and a maximization step. In the expectation step, $\hat{x}$ may be estimated. In the maximization step, $\Theta$ may be estimated. These steps are alternately performed until convergence is achieved. Thus each estimation is refined and the refinement of one estimation is used to refine the other estimation. In this way, it is said that both estimations are refined at substantially the same time.

For example, in the expectation step, the current estimate of $\Theta$ is used to compute the estimated value for $\hat{x}$, for example, using equation (3) above.

Then, in the maximization step, the variance of deviation for the s-th Gaussian mixture component, $\Theta_s$ may be estimated and this value is combines as follows to result in an improved estimate for $\Theta$:

$$\Theta = \sum_{s=1}^{K} P(s|y)\Theta_s \qquad (5)$$

The expectation step and the maximization step may then be alternately repeated until convergence is achieved. Convergence is achieved when each additional step results in only a negligible change.

Each iterative step of the EN approach may involve complex calculations, including calculating the inverse of the covariance matrix $c_{x|s}$ for each Gaussian component, thus when the number of sensors d is large, real-time monitoring may be difficult as the complexity of the EM calculations are computationally expensive.

Exemplary embodiments of the present invention utilize an isotropic Gaussian Model to model each mixture component. Under this approach, $P(x|s) \sim N(m_{x|s}, \sigma^2 I_d)$, where the covariance matrix is the multiplication of a scalar $\sigma^2$ and a d×d identity matrix $I_d$. Accordingly, the complexity of the EM calculation may be substantially reduced and speed may be increased to more easily perform real-time monitoring.

In application, not all mixture components make a substantial contribution to the estimation $\hat{x}$ and $\Theta$. For example, all but several components may have a negligible influence on the estimations. Meanwhile, it may be computationally expensive to process a large number of mixture components. Accordingly, during the first iteration of the EM approach, the probability distribution P(s|y) for each mixture component may be ranked according to their degree of influence within the complete mixture model. For example, the mixture components may be ranked from highest impact to lowest impact. Then, starting with the highest ranked component, components are selected until the sum of the selected components exceeds a desired level. For example, mixture components may be selected until the cumulative influence of the selected mixture components equals or exceeds a 95% influence. Thereafter, only the selected components are used in subsequent EM iterations. In practice, the number of mixture components may be significantly reduced and accordingly, the speed of EM calculations may be further increased.

As discussed above, the Gaussian mixture model for estimating x may be calculated based on training data. The Gaussian mixture model may include a set of mixture components k, and may be a fixed value, for example 60. Each mixture component, as a Gaussian function, may be defined in terms of a component center (mean) $m_{x|s}$ and a variance $\sigma^2$. In calculating each optimal mixture component, these attributes may be determined. For example, the component center may be determined using a k-mean algorithm and the variance $\sigma^2$ may be determined using a leave-one-out process that maximizes the log likelihood of P(x), for example, by computing multiple possible solutions and the using the solution that proves to be most useful.

The leave-one-out process may produce a probability distribution P(x) with a greater generalization performance than may otherwise be obtained by applying maximum likelihood estimation to the entire training set.

After training is complete, the input y is collected. Then, the expectation-maximization (EM) approach may be used to estimate $\hat{x}$ and $\Theta$ at substantially the same time. Such an approach involves the iterative improvement of both unknowns; however initial values may first be provided. In determining an initial value for $\hat{x}$, $\hat{x}$ may be initialized by receiving a value equal to the closest component center to the input y. Then, during the initial EM iteration step, equations (4) and (5) may be computed based on all of the k mixture components.

Next, mixture components may be ranked and selected as described above. Subsequent EM iteration steps are then performed with only the selected mixture components. Then, the estimate $\hat{x}$ may be returned and compared with y. Finally, a potential fault may be detected by comparing $\hat{x}$, y, and the residue $(y-\hat{x})$ in the rule-based decision step.

FIG. 1 is a flow chart illustrating an approach to system condition monitoring according to an exemplary embodiment of the present invention. First, training data 31 may be obtained (Step S510). The training data may be obtained, for example, by running the system under monitoring 33 during normal conditions and recording sensor data. Alternatively, the training data 31 may be provided from a training data database (not shown) or over a computer network (not shown). The training data may have been produced either the system under monitoring 33 or a similar system. Once the system under monitoring is brought on-line and is functioning normally, data obtained during the system's normal operation may be added to the set of training data. Thus, as the monitoring continues under normal conditions, the set of training data may be increased and accordingly, accuracy may increase with use.

Next, P(x), the probability distribution for x, may be defined as a Gaussian mixture model (GEM) comprising a sum of k mixture components (Step S11), for example, P(x) may be calculated using equation (1) discussed above. The k mixture components may then each be determined according to a component center (mean) of $m_{x|s}$ and a variance $\sigma^2$ (Step S12). Then, the condition of the system may be monitored while the system is on-line and operational. Monitoring of the system may be performed by one or more sensors. Sensor data 32 (collectively referred to as y) may be collected (Step S13).

An expectation-maximization (EM) process may then be performed to generalize the relationship between an expected value of a particular sensor $\hat{x}$ and the sensor data y (Step S14). The EM process may include multiple steps, for example, first, the k mixture components may be ranked, as described above (Step S20) and then the most influential mixture components are selected (Step S21). Accordingly, in subsequent EM steps, processing may be expedited by limiting computation to the selected mixture components. Then, estimation of the parameter $\Theta$ and the variable $\hat{x}$ may occur substantially at the same time by alternatively performing an expectation step (Step S22) where the estimation of $\hat{x}$ is calculated based on the latest calculated value for $\Theta$, and a maximization step (Step S23) where the variance of deviation for the s-th Gaussian mixture component $\Theta_s$ is added to $\Theta$.

The expectation (Step S22) and maximization (Step S23) steps may then be repeated for as long as $\hat{x}$ and $\Theta$ have not achieved convergence (No, Step S24). Convergence is achieved when subsequent iterations of both $\hat{x}$ and $\Theta$ no longer provide substantial changes.

After the EM process has achieved convergence (Yes, Step S24), the EM process has completed (Step S14) and $\hat{x}$ may be estimated (Step S15) based on y and the generalized relationship between $\hat{x}$ and y that was determined during the EM process. Finally, the resulting values of $\hat{x}$ and y and the difference between them (the variance) may be considered as part of a rule-based decision step where potential faults are detected (Step 516).

In this step, a potential fault is detected (Yes, Step S16) when the predetermined rules are satisfied based on the values of $\hat{x}$, y and the variance. When a potential fault is detected (Yes, Step S16), an alert may be generated (Step S17). When a potential fault is not detected (No, Step S17), monitoring of the system may continue with the collection of the sensor data y (Step S13).

Exemplary embodiments of the present invention may be tested experimentally. In one such experiment, 35 sensors are placed to monitor a system. The sensors include a gas flow sensor, an inlet temperature sensor, an IGV actuator position sensor, and 32 blade path temperature sensors named BPTC1A, BPTC1B, BPTC2A, . . . , BPTC16B. The system is brought on-line and 2000 data points are collected. Of these, the first 360 data points are used as training data and the remaining 1640 data points are used in testing.

Figure 2:
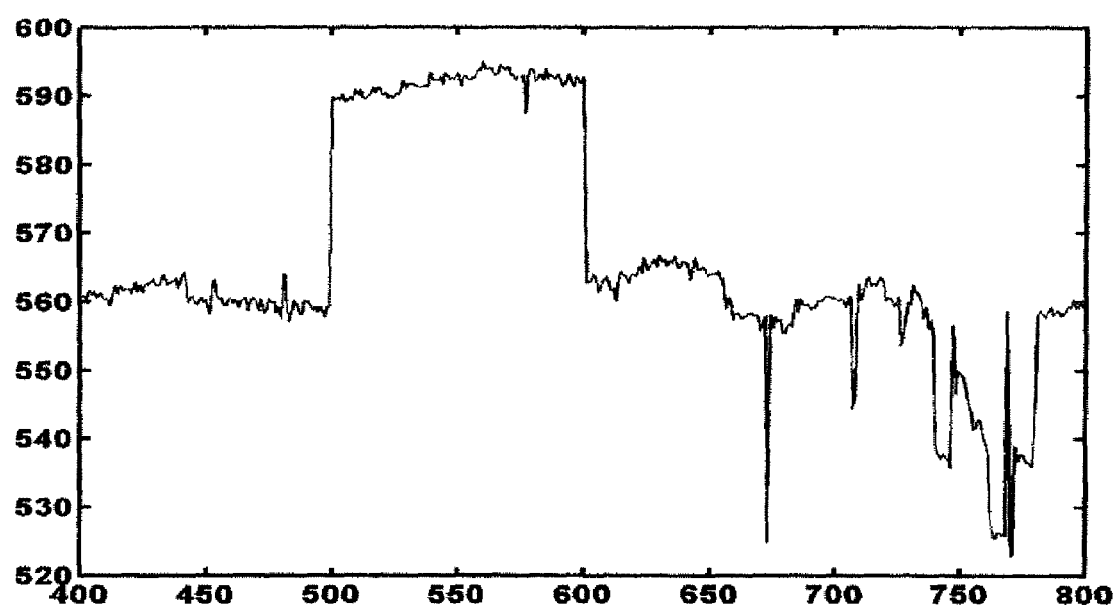
FIG. 2 is a graph showing sensor data for sensor BPTC6B from the 400$^{th}$ data point to the 800$^{th}$ data point.

In this example, the blade path temperature sensor BPTC6B becomes faulty between data points 500 and 600. This fault is represented as an increase of 30° between data points 500 and 600. FIG. 2 is a graph showing sensor data for sensor BPTC6B from the 400$^{th}$ data point to the 800$^{th}$ data point. The numbered data points are shown along the abscissa while the sensed temperature in degrees is shown along the ordinate.

Based on the sensor data, a Gaussian mixture model (GMM) approach in accordance with an exemplary embodiment of the present invention may be utilized to estimate a value for each sensor. For comparison, techniques for estimating sensor values based on support vector regression (SVR) and multivariate state estimation techniques (MSET) may also be used. Based on these approaches, expected sensor values may be calculated and actual sensor values collected, the residues may then be calculated based on the difference between expected and actual sensor values.

During normal operation of the system, residues should be relatively small and during a fault condition, residues should be relatively large. The greater this distinction is, the easier it is to detect a fault. Because the test data includes both normal operation and a fault condition, the test data may be used to gauge the effectiveness of the exemplary embodiment of the present invention (the GMM approach) against the SVR and MSET approaches being tested.

Figure 3:
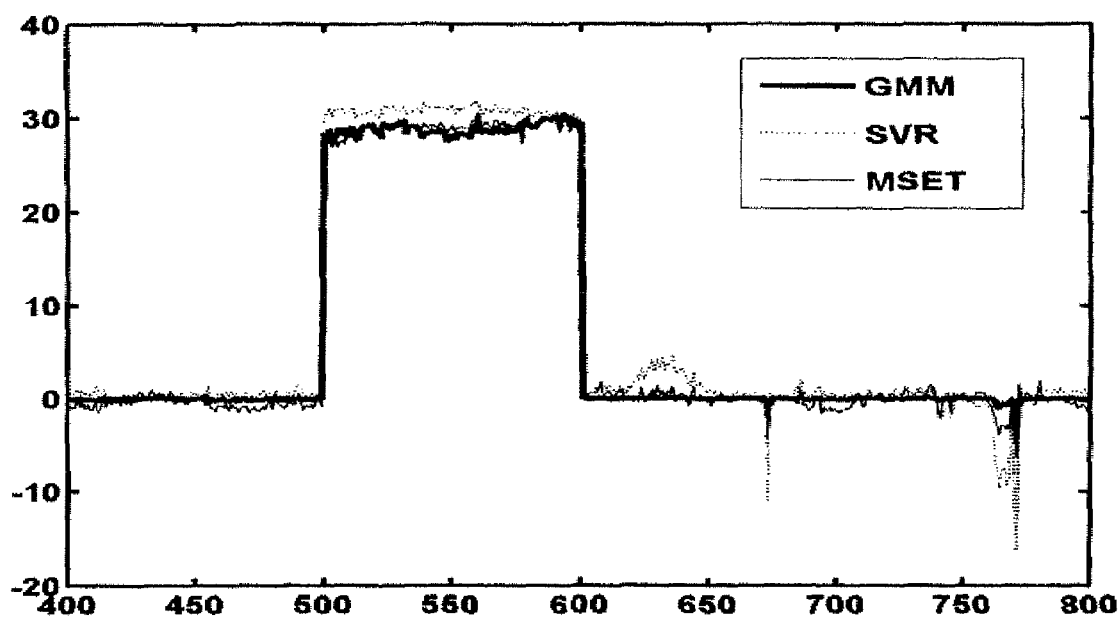
FIG. 3 illustrates results of the GMM approach according to an exemplary embodiment of the present invention as compared to the SVR and MSET approaches during a sensor fault condition.

FIG. 3 illustrates results of the GMM approach according to an exemplary embodiment of the present invention as compared to the SVR and MSET approaches during a sensor fault condition. FIG. 3 shows the residue, the difference between the expected sensor value and actual sensor value for the sensor BPTC6B that is faulty between data point 500 and 600. As can be seen from this graph, the GMM approach shows a relatively small and consistent residue while the sensor is not faulty from data points 400 to 500 and from 600 to 800. However, from data points 500 to 600, while the sensor is faulty, the GMM approach shows a relatively large and consistent residue.

Figure 4:
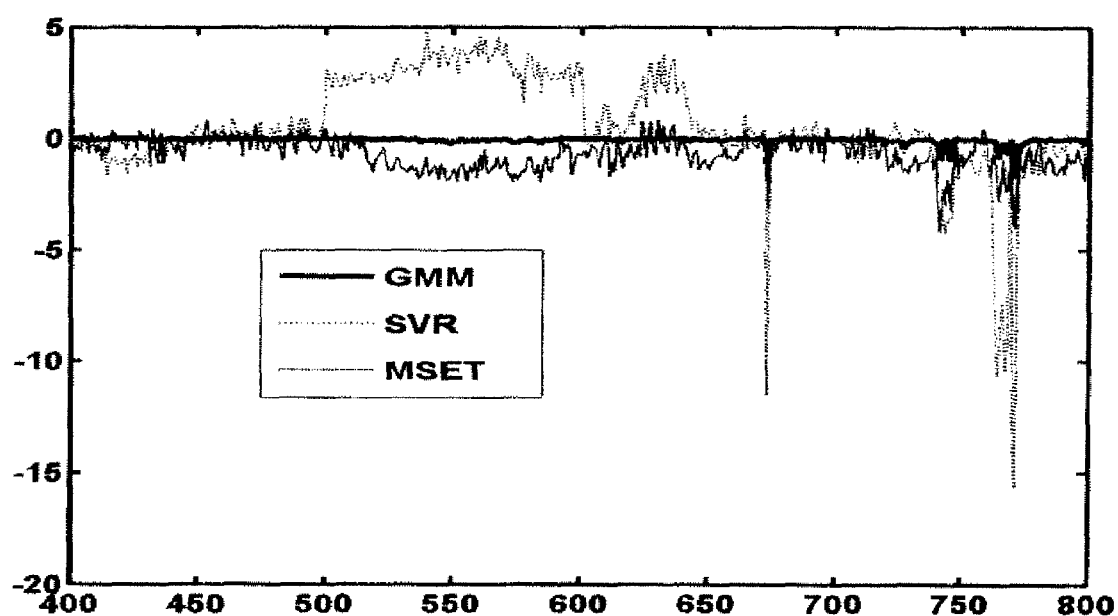
FIG. 4 illustrates the results of the GMM approach according to an exemplary embodiment of the present invention as compared to the SVR and MSET approaches without a sensor fault condition.

FIG. 4 illustrates the results of the GMM approach according to an exemplary embodiment of the present invention as compared to the SVR and MSET approaches without a sensor fault condition. FIG. 4 shows the residue for sensor BPTC1B from data points 400 to 800. There are no sensor faults for this sensor. As can be seen from this graph, the GMM approach shows a relatively small and consistent residue throughout the entire reading. As large residues during fault-free operation are more likely to lead to a false alarm, the relatively small and consistent residue of the GMM approach represents an increased level of precision over the other approaches shown.

Figure 5:
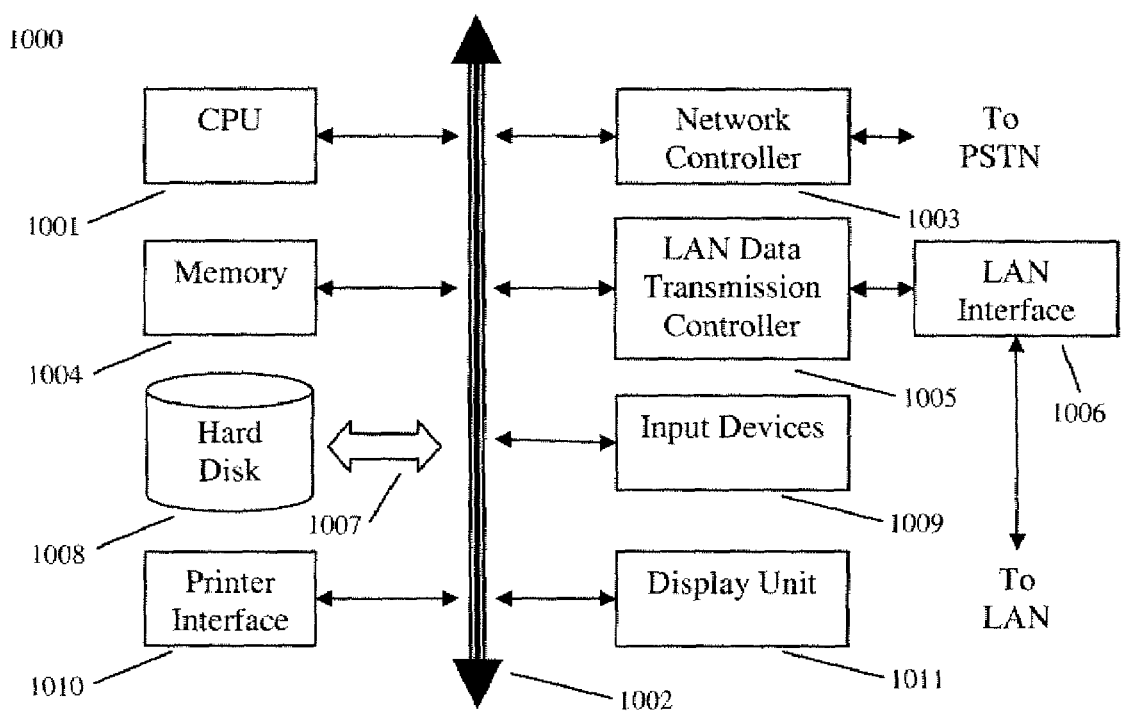
FIG. 5 shows an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for monitoring a system, comprising:
receiving a set of training data;
using a processor for defining a Gaussian mixture model to model a probability distribution for a particular sensor of the system from among a plurality of sensors of the system based on the received training data, the Gaussian mixture model comprising a sum of k mixture components, wherein k is a positive integer;
receiving sensor data from the plurality of sensors of the system; and
performing an expectation-maximization technique to estimate an expected value for the particular sensor based on the defined Gaussian mixture model and the received sensor data from the plurality of sensors,
wherein each of the k mixture components is a Gaussian distribution defined by a mean and a variance that are determined during the performance of the expectation-maximization technique.

2. The method of claim 1, additionally comprising:
receiving an actual senor value from the particular sensor;
comparing the received actual sensor value to the estimated expected sensor value; and
detecting a potential fault based on the comparison.

3. The method of claim 1, wherein the training data comprises sensor data from the plurality of sensors and sensor data from the particular sensor taken during a period of fault-free operation of the system.

4. A method for monitoring a system, comprising:
receiving a set of training data;
using a processor for defining a Gaussian mixture model to model a probability distribution for a particular sensor of the system from among a plurality of sensors of the system based on the received training data, the Gaussian mixture model comprising a sum of k mixture components, wherein k is a positive integer;
receiving sensor data from the plurality of sensors of the system: and performing an expectation-maximization technique to estimate an expected value for the particular sensor based on the defined Gaussian mixture model and the received sensor data from the plurality of sensors, wherein performing the expectation-maximization technique comprises:

ranking the k mixture components according to a degree of influence on the Gaussian mixture model;

selecting a set of mixture components that are most influential;

iteratively improving an estimation of the expected value for the particular sensor based on a diagonal covariance matrix that contributes to a relationship between the received sensor data from the plurality of sensors and the expected value for the particular sensor, using the selected set of mixture components;

iteratively improving an estimation of the diagonal covariance matrix using the selected set of mixture components; and repeating the steps of iteratively improving the estimation of the expected value for the particular sensor and iteratively improving the estimation of the diagonal covariance matrix until the two estimates achieve convergence.

5. The method of claim 4, wherein convergence is achieved when repeating the step of iteratively improving the estimation of the expected value for the particular sensor and iteratively improving the estimation of the diagonal covariance matrix results in a negligible improvement.

6. A method for monitoring a system, comprising:

receiving a set of training data;

using a processor for defining a Gaussian mixture model to model a probability distribution for a particular sensor of the system from among a plurality of sensors of the system based on the received training data, the Gaussian mixture model comprising a sum of k mixture components, wherein k is a positive integer;

receiving sensor data from the plurality of sensors of the system; and performing an expectation-maximization technique to estimate an expected value for the particular sensor based on the defined Gaussian mixture model and the received sensor data from the plurality of sensors, wherein performing the expectation-maximization technique comprises:

estimating the expected value for the particular sensor; and estimating a diagonal covariance matrix that contributes to a relationship between the received sensor data from the plurality of sensors and the expected value for the particular sensor wherein the two estimations are performed at substantially the same time.

7. A system for monitoring a machine, comprising:

a plurality of sensors for monitoring the machine including a particular sensor;

a Gaussian mixture model defining unit for defining a Gaussian mixture model to for estimating an expected value for the particular sensor, the Gaussian mixture model comprising a sum of a plurality of k mixture components, wherein k is a positive integer; and an estimation unit for estimating the expected value for the particular sensor based on the defined Gaussian mixture model, wherein each of the k mixture components is a Gaussian distribution defined by a mean and a variance that are determined during the performance of estimating the expected value for the particular sensor.

8. The system of claim 7, additionally comprising training data for use by the Gaussian mixture model defining unit in defining the plurality of mixture components.

9. The system of claim 8, wherein the training data comprises sensor data from the plurality of sensors and sensor data from the particular sensor taken during a period of fault-free operation of the machine.

10. The system of claim 7, wherein an expectation-maximization technique is used to estimate an expected value for the particular sensor based on the defined Gaussian mixture model and the received sensor data from the plurality of sensors.

11. The system of claim 10, wherein performing the expectation-maximization technique comprises:

estimating the expected value for the particular sensor; and estimating a diagonal covariance matrix that contributes to a relationship between the received sensor data from the plurality of sensors and the expected value for the particular sensor, wherein the two estimations are performed at substantially the same time.

12. A system for monitoring a machine, comprising:

a plurality of sensors for monitoring the machine including a particular sensor;

a Gaussian mixture model defining unit for defining a Gaussian mixture model to for estimating an expected value for the particular sensor, the Gaussian mixture model comprising a sum of a plurality of mixture components; and an estimation unit for estimating the expected value for the particular sensor based on the defined Gaussian mixture model, wherein an expectation-maximization technique is used to estimate an expected value for the particular sensor based on the defined Gaussian mixture model and the received sensor data from the plurality of sensors, and wherein performing the expectation-maximization technique comprises:

ranking the plurality of mixture components according to a degree of influence on the Gaussian mixture model;

selecting a set of mixture components that are most influential;

iteratively improving an estimation of the diagonal covariance matrix using the selected set of mixture components; and repeating the steps of iteratively improving the estimation of the expected value for the particular sensor and iteratively improving the estimation of the diagonal covariance matrix until the two estimates achieve convergence.

13. The system of claim 12, wherein convergence is achieved when repeating the steps of iteratively improving the estimation of the expected value for the particular sensor and iteratively improving the estimation of the diagonal covariance matrix results in a negligible improvement.

14. A computer system comprising:

a processor; and a program storage device readable by the computer system, embodying a program of instruction executable by the processor to perform method steps for monitoring a system, the method comprising:

receiving a set of training data;

defining a Gaussian mixture model to model a probability distribution for a particular sensor of the system from among a plurality of sensors of the system based on the received training data the Gaussian mixture model comprising a sum of k mixture components, wherein k is a positive integer;

receiving sensor data from the plurality of sensors of the system; and performing an expectation-maximization technique to estimate an expected value for the particular sensor based on the defined Gaussian mixture model and the received sensor data from the plurality of sensors, wherein each of the k mixture components is a Gaussian distribution defined by a mean and a variance that are determined during the performance of the expectation-maximization technique.

15. The computer system of claim 14, additionally comprising:

receiving an actual senor value from the particular sensor;

comparing the received actual sensor value to the estimated expected sensor value; and detecting a potential fault based on the comparison.

16. The computer system of claim 14, wherein performing the expectation-maximization technique comprises:

ranking the k mixture components according to a degree of influence on the Gaussian mixture model;

selecting a set of mixture components that are most influential;

iteratively improving an estimation of the expected value for the particular sensor based on a diagonal covariance matrix that contributes to a relationship between the received sensor data from the plurality of sensors and the expected value for the particular sensor, using the selected set of mixture components;

iteratively improving an estimation of the diagonal covariance matrix using the selected set of mixture components; and repeating the steps of iteratively improving the estimation of the expected value for the particular sensor and iteratively improving the estimation of the diagonal covariance matrix until the two estimates achieve convergence.

17. The computer system of claim 16 wherein convergence is achieved when repeating the steps of iteratively improving the estimation of the expected value for the particular sensor and iteratively improving the estimation of the diagonal covariance matrix results in a negligible improvement.

18. The computer system of claim 14, wherein performing the expectation-maximization technique comprises:

estimating the expected value for the particular sensor; and estimating a diagonal covariance matrix that contributes to a relationship between the received sensor data from the plurality of sensors and the expected value for the particular sensor, wherein the two estimations are performed at substantially the same time.

19. The computer system of claim 14, wherein the training data comprises sensor data from the plurality of sensors and sensor data from the particular sensor taken during a period of fault-free operation of the system.

* * * * *